Patented July 8, 1941

2,248,911

UNITED STATES PATENT OFFICE 2,248,911

BENZENE SULPHONIC ACID DERIVATIVES AND MANUFACTURE THEREOF

Robert Behnisch, Josef Klarer, and Fritz Mietzsch, Wuppertal-Elberfeld, Germany, assignors to Winthrop Chemical Company, Inc., New York, N. Y., a corporation of New York No Drawing. Application March 7, 1939, Serial No. 260,332. In Germany March 8, 1938

23 Claims. (Cl. 260—397.7)

The present invention relates to the manufacture of benzene sulphonic acid derivatives and to the products obtainable by such manufacture.

In accordance with the present invention chemotherapeutically valuable compounds are obtained when manufacturing benzene sulphonic acid anilides being substituted at least in the 3'- and 5'-positions of the anilide radical by halogen or halogenalkyl and besides bearing in the 4-position of the benzene radical a nitrogen containing group. This nitrogenous group may be represented, for instance, by the amino group, by alkylamino groups such as the methyl- and dimethylamino, diethyl- and diallylamino groups, by acylamino groups such as the acetyl-, propionyl, hydroxy-propionyl, α-ethyl-butyryl, benzoyl, phenylacetyl, and phenyl-hydroxyacetyl groups, by azomethine groups, such as the benzylidene-, heptylidene-, phenylethylidene and cinnamylidene groups. Bromine is the preferred halogen substituent in the 3'- and 5'-positions of the anilide radical but also chlorine, iodine and fluorine may be present; the trifluoromethyl group has proved as an especially suitable halogen alkyl group.

The compounds of the afore-mentioned nature have proved effective with the canary bird to malaria prophylaxis tests and in malaria curative tests (according to Roehl), while compounds of similar structure but missing the anilide group which is disubstituted in the 3'- and 5'-positions in the above indicated manner, as for instance the 4-aminobenzene sulphonamide, the 4-aminobenzene sulphonanilide, 2',4'-diamino-azobenzene-4-sulphonamide, 4'-sulphonamido-phenylazo-7-acetylamino-1-hydroxy-naphthalene-3.6-disulphonic acid sodium and the like are inactive in the same tests.

The substitution by amino and acylamino groups in 4-position and by halogen and halogenalkyl groups in 3', 5'-positions has proved as being especially favourable.

The manufacture of the afore-mentioned compounds can be performed in the following way: Benzene sulphonic acids or their reactive derivatives, as for instance esters or halides, bearing in the 4-position the nitrogen atom of a nitrogen-containing group, as for instance an amino-, acylamino-, alkylamino- or azomethine group, are reacted with such aniline compounds, containing at least one free hydrogen atom in the amino group and which besides are at least substituted in the 3- and 5-positions by halogen or halogenalkyl.

The new products are also obtainable by starting with benzene sulphonic acid anilides which at least are substituted in the 3'- and 5'-positions of the anilide radical by halogen or halogenalkyl and contain in the 4-position of the benzene ring a group, for instance halogen, which is replaceable by a nitrogenous group of the kind specified, or a group, for instance the carboxylic acid-amide, -hydrazide or -hydroxylamide group, which can be transformed into an amino group; in such compounds the group replaceable by a nitrogenous group is replaced by such a group, for instance by the amino or alkyl amino group or the group convertible into the amino group is transformed into this group. According to the working method also the various nitrogenous groups can be converted into each other, thus converting products of lower into products of higher activity. In this manner, for instance, nitro- or azo groups can be reduced to amino groups, acylamino- or azomethine groups can be hydrolyzed to amino groups, but vice versa also amino groups can be converted into acylamino groups by means of acylating agents or into azomethine groups by reaction with aldehydes.

The new compounds are also obtainable by transforming into halogen substituents convertible into halogen and standing in the 3'- and 5'-positions of the anilide radical of benzene sulphonic acid anilides which contain in the 4-position of the benzene radical a nitrogenous group, for instance an amino-, acylamino-, alkylamino- or azomethine group. The reaction of nitro- and amino groups, the subsequent diazotization and substitution of the diazo groups by halogen has proved as being especially suitable. One may also halogenate alkyl substituents subsequently, for instance methyl to trifluoromethyl.

The invention is illustrated by the following examples without being restricted thereto.

Example 1

250 grams of 4-acetylamino-benzene sulphonic acid chloride are gradually added to a solution of 162 grams of 3.5-dichloro aniline in 400 ccs. of pyridine. After one hour's heating on the water-bath the clear yellow-brown solution is poured into 2 liters of a 20% ice-cooled hydrochloric acid while stirring, the precipitate formed is filtered with suction and washed with water. It is dissolved in 1 liter of cold normal sodium hydroxide solution, the solution is filtered through active charcoal and acidified with acetic acid. The 4-acetylamino-benzene sulphonic acid-3',5'-dichloro anilide obtained is filtered with suction. After redissolution from acetone it forms colorless needles melting at 238° C.

The 4-aminobenzene sulphonic acid-3',5'-dichloro anilide is obtained in colorless needles, melting at 150° C. by one hour's boiling of the said acetyl compound with a 16% sodium hydroxide solution, by precipitation with acetic acid and by redissolution from methanol.

In a corresponding manner the 4-acetylaminobenzene sulphonic acid-3',5'-dibromoanilide melting at 244° C. when using 3.5-dibromo-aniline, and therefrom by saponification the 4-aminobenzene-sulphonic acid-3',5'-dibromo anilide melting at 150° C.; the 4-acetylaminobenzene-sulphonic acid-3',5'-diiodo aniline melting at 277° C. when using the 3.5-diiodo aniline, and therefrom by saponification the 4-aminobenzene-sulphonic acid-3',5'-diiodo aniline melting at 199° C.; the 4-acetylaminobenzene-sulphonic acid-3',5'-di-(trifluoromethyl)-anilide melting at 211° C. when using 3.5-di(trifluoromethyl)-aniline and therefrom by saponification the 4-aminobenzene-sulphonic acid-3',5'-di-(trifluoromethyl)-anilide melting at 166° C.; the 4-acetylaminobenzene-sulphonic acid-3',4',5'-trichloro anilide melting at 271° C. when using the 3,4,5-trichloro aniline, and therefrom by saponification the 4-aminobenzene-sulphonic acid-3',4',5'-trichloro-anilide melting at 211° C.

*Example 2*

16 grams of 3.5-dichloro-aniline dissolved in 50 ccs. of pyridine are mixed with 22 grams of 4-nitrobenzene-sulphonic chloride and the mixture is heated on the water-bath for 30 minutes. The clear brown solution is poured while stirring into excess hydrochloric acid, the precipitate is filtered with suction, dissolved in normal sodium hydroxide solution and reprecipitated by the addition of hydrochloric acid. The 4-nitrobenzene-sulphonic acid-3',5'-dichloro-anilide thus obtained melts at 189° C. after recrystallization from methanol.

In a corresponding manner the 4-nitrobenzene-sulphonic acid-3',5'-dibromo-anilide melting at 172° C. is obtained when using 3.5-dibromo-aniline; the 4-nitrobenzene-sulphonic acid-3',5'-di-(trifluormethyl)-anilide melting at 138° C. when using 3.5-di-(trifluormethyl)-aniline.

These nitro compounds are converted into the above-named amino compounds by means of reduction. 43 grams of 4-nitrobenzene-sulphonic acid-3',5'-dibromo-anilide, for instance, are heated to boiling for 3 hours with 200 ccs. of water and 70 grams of iron borings cauterized with acetic acid. After treatment with excess sodium hydroxide solution the mixture is filtered while hot and the filtrate is acidified with acetic acid. The precipitate is filtered with suction and redissolved from methanol. The 4-aminobenzene-sulphonic acid-3',5'-dibromo-anilide is obtained in solid crystals melting at 150° C.

*Example 3*

15 grams of 4-aminobenzene-sulphonic acid-3',5'-dichloro-anilide are heated to boiling with 50 ccs. of alcohol and 7 grams of 2-hydroxybenzaldehyde for 5 hours. The solvent is completely evaporated, the residue is caused to crystallize and redissolved from methanol. The 4-(2''-hydroxybenzylidene)-aminobenzene-sulphonic acid-3',5'-dichloro-anilide is obtained in orange colored crystals melting at 164° C. When performing the reaction by means of 4-methoxy-benzaldehyde, the 4-(4''-methoxy-benzylidene)-aminobenzene-sulphonic acid-3',5'-dichloroanilide is obtained in colorless needles melting at 176° C.

*Example 4*

31 grams of 4-aminobenzene-sulphonic acid-3',5'-dichloro-anilide are dissolved in 200 ccs. of acetone and 20 ccs. of pyridine and slowly treated with 15 grams of propionic acid chloride. After half an hour's heating on the water-bath the reaction solution is poured into water while stirring, and the precipitate is filtered with suction. The 4-propionylamino-benzene-sulphonic acid-3',5'-dichloroanilide is obtained in colorless crystals melting at 236° C. by dissolution from dilute acetone.

In a corresponding manner the 4-diethylacetylamino-benzene-sulphonic acid-3',5'-dichloroanilide melting at 192° C. is obtained when using diethylacetic acid chloride; the 4-phenylacetylamino-benzene-sulphonic acid-3',5'-dichloroanilide melting at 204° C. when using phenylacetic acid chloride.

*Example 5*

38 grams of 4-bromobenzene-sulphonic acid-3',5'-dichloro-anilide (obtained by reacting 4-bromobenzene-sulphonic acid chloride on 3.5-dichloro-aniline, colorless needles melting at 150° C.) are heated with 200 ccs. of saturated methylalcoholic ammonia solution and some copper powder in a pressure vessel for 12 hours up to 200–220° C. The solution resulting from the reaction is filtered, evaporated to dryness and the residue is extracted with normal sodium hydroxide solution. When acidifying the alkaline extract with acetic acid, the 4-aminobenzene-sulphonic acid-3',5'-dichloro-anilide is obtained, which when redissolved from methanol melts at 150° C.

If instead of ammonia an alcoholic solution of dimethylamine is used, the 4-dimethylamino-benzene-sulphonic acid-3',5'-dichloroanilide is obtained in colorless needles, melting at 195° C., when using piperidine the 4-piperido-(1'')-benzene-sulphonic acid-3',5'-dichloro-anilide is obtained.

*Example 6*

61 grams of 3.5-dinitraniline are dissolved in 300 ccs. of pyridine and treated with 90 grams of 4-acetylaminobenzene sulphonic acid chloride. After a 5 hours' heating on the water-bath the reaction product is poured into water, the precipitate is filtered with suction and dissolved in normal sodium hydroxide solution. When acidifying the filtered alkaline solution with acetic acid the 4-acetyl-aminobenzene-sulphonic acid-3',5'-dinitro-anilide is obtained as a yellow powder, melting at 273° C. The 4-acetylaminobenzene-sulphonic acid-3',5'-diamino-anilide is obtained therefrom by reduction with iron in dilute acetic acid in slightly brownish colored crystals melting at 264° C. When reacting this compound according to Sandmeyer in the manner known per se, for instance by diazotization and pouring into cuprous chloride and hydrochloric acid, the 4-acetylaminobenzene-sulphonic acid-3',5'-dichloro-anilide is obtained in colorless crystals melting at 238° C.

*Example 7*

28 grams of azobenzene-4-sulphochloride are added to a solution of 25.1 grams of 3.5-dibromoaniline, dissolved in 50 ccs. of pyridine. The mixture is heated on the water-bath for one hour. Thereupon the solution is poured while stirring into 200 ccs. of ice-cooled 20% hydrochloric acid, the precipitate is filtered with suction and washed with water. After dissolution in sodium hydroxide solution, filtration and reprecipitation with acetic acid it is recrystallized from dilute alcohol. The azobenzene-4-sulphonic acid-3',5'-dibromo-anilide, thus obtained, forms crystals melting at 134° C.

10 grams of the compound described before are dissolved in dilute sodium hydroxide solution and solid sodium hydrosulphite is added while slightly heating until the solution remains permanently decolorized. The 4-amino-benzene-sulphonic acid-3',5'-dibromo-anilide melting at 150° C. is obtained after precipitation with acetic acid and redissolution from methanol.

Instead of starting with the azo compounds, the hydrazobenzene-4-sulphonic acid-3',5'-dibromo-anilide can also be used, which is manufactured from the azo compound by means of mild reducing agents such as sodium amalgam or zinc dust in aqueous alkaline solution.

*Example 8*

32.4 grams of 4-(4'-nitrobenzylidene-amino)-benzene-sulphochloride (manufactured by treatment of 4-nitrobenzylidene-aniline with chlorosulphonic acid, from methylene-chloride yellowish crystals melting at 111° C.) are added to a solution of 25.1 grams of 3.5-dibromo-aniline in 100 ccs. of pyridine, and heated on the water-bath for 30 minutes. On cooling the 4-(4''-nitrobenzylidene-amino)-benzene-sulphonic acid-3',5'-dibromo-anilide crystallizes in yellow leaflets. It is filtered with suction, washed out with pyridine, later on with alcohol and at the end with acetone; it then melts at 239° C. It is soluble in dilute cold sodium hydroxide solution with yellow color. The compound is readily saponified by boiling in dilute hydrochloride solution. After cooling the solidified product is filtered with suction. It is extracted with cold dilute sodium hydroxide solution. The 4-nitro-benzaldehyde remaining undissolved is filtered off. The filtrate is treated with ammonium chloride and the 4-aminobenzene-sulphonic acid-3',5'-dibromo-anilide precipitated in this manner. It melts at 150° C. after recrystallization from methanol.

In an analogous manner a 4-benzylidene-amino-benzene-sulphochloride may be converted into the 4-benzylidene-amino-benzene-sulphonic acid-3',5'-dibromo-anilide-4-cinnamylidene-amino-benzene-sulphochloride may be converted into the 4-cinnamylideneamino-benzene-sulphonic acid-3',5'-dibromo-anilide and the reaction products may be saponified to 4-aminobenzene-sulphonic acid-3',5'-dibromoanilide in the manner indicated above.

We claim:

1. A benzenesulphonic acid-anilide which is substituted in the sulphonated benzene ring in 4-position to the sulpho group by the nitrogen atom of a nitrogenous grouping selected from the group consisting of amino-, carboxyacylamino-, alkylamino- and azo-methine-groups and which is substituted in the anilide radical at least in the 3'- and 5'-positions to the amino group by substituents selected from the group consisting of halogen and halogenalkyl.

2. A benzenesulphonic acid-anilide which is substituted in the sulphonated benzene ring in 4-position to the sulpho group by an amino group and which is substituted in the anilide radical at least in the 3'- and 5'-positions to the amino group by substitutents selected from the group consisting of halogen and halogenalkyl.

3. A benzenesulphonic acid-anilide which is substituted in the sulphonated benzene ring in 4-position to the sulpho group by the nitrogen atom of a nitrogenous grouping selected from the group consisting of amino-, carboxyacylamino-, alkylamino- and azomethine-groups and which is substituted in the anilide radical at least in the 3'- and 5'-positions to the amino group by halogen atoms.

4. A benzenesulphonic acid-anilide which is substituted in the sulphonated benzene ring in 4-position to the sulpho group by an amino group and which is substituted in the anilide radical at least in the 3'- and 5'-positions to the amino group by halogen atoms.

5. A benzenesulphonic acid-anilide which is substituted in the sulphonated benzene ring in 4-position to the sulpho group by the $H_2N-$ group and which is substituted in the anilide radical at least in the 3'- and 5'-positions to the amino group by substituents selected from the group consisting of halogen and halogenalkyl.

6. A benzenesulphonic acid-anilide which is substituted in the sulphonated benzene ring in 4-position to the sulpho group by the $H_2N-$ group and which is substituted in the anilide radical at least in the 3'- and 5'-positions to the amino group by halogen atoms.

7. A 4-aminobenzenesulphonic acid-3',5'-di-halogen-anilide of the formula

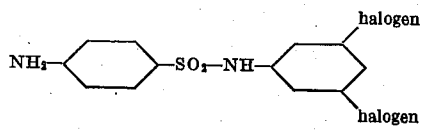

8. 4-Aminobenzenesulphonic acid-3'-5'-dibromo-anilide melting at 150° C.

9. The process which comprises reacting a benzenesulphohalide which is substituted in 4-position to the sulphohalide group by the nitrogen atom of a nitrogenous group selected from the group consisting of amino-, carboxyacylamino-, alkylamino and azomethine-groups, with a primary aniline which is at least substituted in the 3- and 5-positions by substituents selected from the group consisting of halogen and halogenalkyl.

10. The process which comprises reacting a benzenesulphohalide which is substituted in 4-position to the sulphohalide group by an amino group, with a primary aniline which is at least substituted in the 3- and 5-positions by substituents selected from the group consisting of halogen and halogenalkyl.

11. The process which comprises reacting a benzene-sulphohalide which is substituted in 4-position to the sulphohalide group by the nitrogen atom of a nitrogenous group selected from the group consisting of amino-, carboxyacylamino-, alkylamino- and azomethine-groups with a primary aniline which is at least substituted in the 3- and 5-positions by halogen atoms.

12. The process which comprises reacting a benzenesulphohalide which is substitued in 4-position to the sulphohalide group by an amino group, with a primary aniline which is at least substituted in the 3- and 5-position by halogen atoms.

13. The process which comprises reacting a 4-carboxyacylaminobenzene sulphohalide of the formula

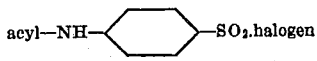

with a primary aniline which is at least substituted in the 3- and 5-positions by substituents selected from the group consisting of halogen and halogenalkyl.

14. The process which comprises reacting a 4-carboxyacylaminobenzene sulphohalide of the formula

with a primary aniline which is at least substituted in the 3- and 5-positions by halogen atoms.

15. The process which comprises reacting upon a 4-carboxyacylamino benzenesulphochloride of the formula

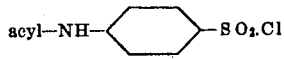

with 3,5-dihalogenaniline.

16. The process which comprises reacting upon a 4-carboxyacylamino benzenesulphochloride of the formula

with 3,5-dibromoaniline.

17. Process as claimed in claim 15 in which the carboxyacyl group of the reaction product is subsequently split off by saponification.

18. Process as claimed in claim 16 in which the carboxyacyl group of the reaction product is subsequently split off by saponification.

19. 4 - aminobenzenesulphonic acid - 3',5'-dichloroanilide melting at 150° C.

20. A benzenesulphonic acid-anilide which is substituted in the sulphonated benzene ring in 4-position to the sulpho group by the nitrogen atom of a nitrogenous grouping selected from the group consisting of amino-, carboxyacylamino-, alkylamino- and azomethine- groups and which is substituted in the anilide radical at least in the 3'- and 5'-positions to the amino group by trifluoromethyl groups.

21. A benzenesulphonic acid-anilide which is substituted in the sulphonated benzene ring in 4-position to the sulpho group by an amino group and which is substituted in the anilide radical at least in the 3'- and 5'-positions to the amino group by trifluoromethyl groups.

22. A benzene sulphonic acid-anilide which is substituted in the sulphonated benzene ring in 4-position to the sulpho group by the $H_2N$-group and which is substituted in the anilide radical at least in the 3'- and 5'-positions to the amino group by trifluoromethyl groups.

23. 4 - aminobenzenesulphonic acid - 3',5'-di-(trifluoromethyl)-anilide melting at 166° C.

ROBERT BEHNISCH.
JOSEF KLARER.
FRITZ MIETZSCH.